(12) United States Patent
Selph et al.

(10) Patent No.: US 8,385,528 B2
(45) Date of Patent: Feb. 26, 2013

(54) COMMUNICATION MANAGEMENT FEATURE

(75) Inventors: Douglas S. Selph, Chicago, IL (US); Mark Dyer, Reading (GB); Enrique J. Wong, San Jose, CA (US); Kenneth F. Wolfinger, Skokie, IL (US); Charles M. Kellerhals, Gurnee, IL (US); Bradley T. Kranz, Slingerlands, NY (US); Daniel P. Quigley, Woodinville, WA (US); John T. Braun, Vernon Hills, IL (US)

(73) Assignee: Tip Solutions, Inc., Buffalo Grove, IL (US)

( * ) Notice: Subject to any disclaimer, the term of this patent is extended or adjusted under 35 U.S.C. 154(b) by 210 days.

(21) Appl. No.: 12/947,666

(22) Filed: Nov. 16, 2010

(65) Prior Publication Data

US 2011/0116616 A1 May 19, 2011

Related U.S. Application Data

(60) Provisional application No. 61/261,902, filed on Nov. 17, 2009, provisional application No. 61/346,790, filed on May 20, 2010.

(51) Int. Cl.
H04M 3/42 (2006.01)

(52) U.S. Cl. ................. 379/210.02; 455/412.1

(58) Field of Classification Search ............ 379/210.02; 455/412.1
See application file for complete search history.

(56) References Cited

U.S. PATENT DOCUMENTS

| | | | |
|---|---|---|---|
| 6,219,414 B1 | 4/2001 | Maciejewski et al. | |
| 6,393,272 B1 | 5/2002 | Cannon et al. | |
| 6,430,269 B1 | 8/2002 | Kanerva | |
| 6,470,196 B1 | 10/2002 | Yamashita | |
| 6,574,471 B1 | 6/2003 | Rydbeck | |
| 6,633,634 B1 | 10/2003 | Crocket et al. | |
| 6,654,615 B1 | 11/2003 | Chow et al. | |
| 6,728,558 B1 | 4/2004 | Kubo et al. | |
| 6,738,467 B1 | 5/2004 | Infosino | |
| 6,760,581 B2 | 7/2004 | Dutta | |
| 6,782,252 B1 | 8/2004 | Kang et al. | |
| 6,829,343 B2 | 12/2004 | Maciejewski et al. | |
| 6,850,604 B2 | 2/2005 | Cannell et al. | |
| 6,975,709 B2 | 12/2005 | Wullert, II | |
| 7,006,618 B1 | 2/2006 | Shaffer et al. | |
| 7,010,288 B2 | 3/2006 | Brown et al. | |
| 7,139,383 B2 | 11/2006 | Maciejewski et al. | |

(Continued)

FOREIGN PATENT DOCUMENTS

| KR | 10-2006-0050668 A | 5/2006 |
|---|---|---|
| WO | 2005083995 A1 | 9/2005 |

OTHER PUBLICATIONS

Mason Inman, Welcome to the Open Source Cellphone, http://www.tmcnet.com/usubmit/2006/03/10/1447852.htm, Mar. 10, 2006.

(Continued)

*Primary Examiner* — Quynh Nguyen
(74) *Attorney, Agent, or Firm* — Levenfeld Pearlstein, LLC

(57) ABSTRACT

A method for screening incoming communications includes the steps of receiving an incoming communication intended for a communication device or a recipient and identifying a sender of the communication and a communication type, which can includes an email. The method also includes the steps of identifying screening settings based on the sender and the communication type and determining whether the communication is allowed in accordance with the identified settings. Further, the method includes the steps of notifying a recipient of the communication, if the communication is allowed. In addition, the method includes the step of processing the communication without notifying a recipient, if the communication is not allowed.

17 Claims, 4 Drawing Sheets

U.S. PATENT DOCUMENTS

| | | |
|---|---|---|
| 7,231,232 B2 | 6/2007 | Osann, Jr. |
| 7,254,226 B1 | 8/2007 | Roberts et al. |
| 7,330,713 B2 | 2/2008 | Zhu |
| 7,330,721 B2 | 2/2008 | Bhatia et al. |
| 7,388,952 B2 | 6/2008 | Maciejewski et al. |
| 7,391,859 B2 | 6/2008 | Crockett et al. |
| 2002/0061097 A1 | 5/2002 | Kanerva |
| 2003/0054865 A1 | 3/2003 | Byers et al. |
| 2003/0100261 A1 | 5/2003 | Gusler et al. |
| 2003/0153364 A1 | 8/2003 | Osann, Jr. |
| 2003/0190028 A1 | 10/2003 | Maciejewski et al. |
| 2004/0137883 A1 | 7/2004 | Crockett et al. |
| 2004/0203794 A1 | 10/2004 | Brown et al. |
| 2004/0214553 A1 | 10/2004 | Kang et al. |
| 2005/0147212 A1 | 7/2005 | Benco et al. |
| 2007/0213100 A1 | 9/2007 | Osann, Jr. |
| 2008/0076395 A1 | 3/2008 | Bhatia et al. |
| 2008/0146199 A1 | 6/2008 | Horodezky et al. |
| 2008/0205619 A1 | 8/2008 | Kalaboukis et al. |
| 2008/0304637 A1 | 12/2008 | Ganganna |
| 2009/0010415 A1 | 1/2009 | Ustby |
| 2009/0122967 A1 | 5/2009 | Loisch et al. |

OTHER PUBLICATIONS

International Search Report and the Written Opinion of the International Searching Authority issued Jul. 28, 2011, in connection with PCT/US2010/056977.

US 8,385,528 B2

COMMUNICATION MANAGEMENT FEATURE

CROSS REFERENCE TO RELATED APPLICATIONS

This application claims the benefit of U.S. Provisional Application No. 61/261,902, filed Nov. 17, 2009, and U.S. Provisional Application No. 61/346,790, filed May 20, 2010, each of which is incorporated by reference herein in its entirety.

BACKGROUND OF THE INVENTION

1. Field of the Invention

The present invention is directed to a communication management feature and, more particularly, to such a feature for restricting, filtering, and/or screening incoming communications to a device.

2. Background of the Invention

Devices capable of receiving communications, such as phone calls, text messages, electronic mail, instant messaging requests, and other electronic updates and information are becoming increasingly prevalent. Such devices come in a wide variety and may be generally stationary, such as a desktop computer, TV/Set-Top box, static game console, etc., or may be easily portable, such as a smart phone, tablet computer, personal digital assistant ("PDA"), portable game console, portable media device, etc. Further, such devices may receive communications through a wide variety of wired or wireless connections, standards, or protocols, such as the Internet, an intranet, voice over internet protocol ("VOIP"), satellite, 3G, SMS, MMS, 4G, WIMAX, etc.

Generally, recipients have various options as to how they will be notified of incoming communications. Referring to phone calls, for example, the recipient can set the device to a default setting or mode that provides an audible, tactile, and/or visual indication of the incoming communication. In certain situations, such as during a meeting, school exam, religious ceremony, etc., it is generally courteous to set the device to a silent or vibrate-only default mode or to turn the device off to avoid an incoming communication causing a disruption. However, such silent and vibrate modes and the option to turn off the device are not suitable in all situations.

In one illustrative scenario, an individual, John, is about to attend a meeting but expects an important call from a client that must be answered. John joins the meeting with his cell phone turned on but set to vibrate. Within a few minutes after the meeting commences, John's cell phone vibrates and he looks to see if it is the important client call. It is not. John's cell phone continues to ring intermittently with other calls during the meeting and he is constantly checking the phone to see who is calling. With only a few minutes of the meeting left, John is feeling nervous as the cell phone battery is almost depleted and the important client call has not yet come through. In the present scenario, the inability to screen incoming communications has resulted in a highly disruptive situation even with the cell phone set to vibrate.

This inability to screen incoming communications effectively is exacerbated if other types of communications are involved besides just phone calls, for example, text messages and emails.

Consequently, there is a need for a communication management system, method, application, or feature that restricts, filters, or screens incoming communications to a device in a manner that that overcomes one or more of the above-noted deficiencies.

SUMMARY OF THE INVENTION

According to one example, a method for screening incoming communications includes the steps of receiving an incoming communication intended for a communication device of a recipient and identifying a sender of the communication and a communication type, which includes an email. The method also includes the steps of identifying screening settings based on the sender and communication type and determining whether the communication is allowed in accordance with the identified settings. Further, the method includes the steps of notifying a recipient of the communication, if the communication is allowed. In addition, the method includes the step of processing the communication without notifying a recipient, if the communication is not allowed.

According to another example, a software system stored in a computer-readable medium for screening incoming communications includes a first routine that receives an incoming communication and a second routine that identifies a sender of the communication and a communication type, which includes an email. A third routine identifies screening settings based on the sender and communication type and a fourth routine determines whether the communication is allowed in accordance with the identified settings. A fifth routine notifies a recipient of the communication, if the communication is allowed. A sixth routine processes the communication without notifying a recipient, if the communication is not allowed.

According to a further example, a system for screening incoming communications includes means for receiving an incoming communication and means for identifying a sender of the communication and a communication type, which includes an email. The system also includes means for identifying screening settings based on the sender and communication type and means for determining whether the communication is allowed in accordance with the identified settings. Further, the system includes means for notifying a recipient of the communication, if the communication is allowed. In addition, the system includes means for processing the communication without notifying a recipient, if the communication is not allowed.

These and other features and advantages of the present invention will be apparent from the following detailed description, in conjunction with the appended claims.

BRIEF DESCRIPTION OF THE DRAWINGS

Details of the present invention, including non-limiting benefits and advantages, will become more readily apparent to those of ordinary skill in the relevant art after reviewing the following detailed description and accompanying drawings, wherein.

DETAILED DESCRIPTION

Figure 1:
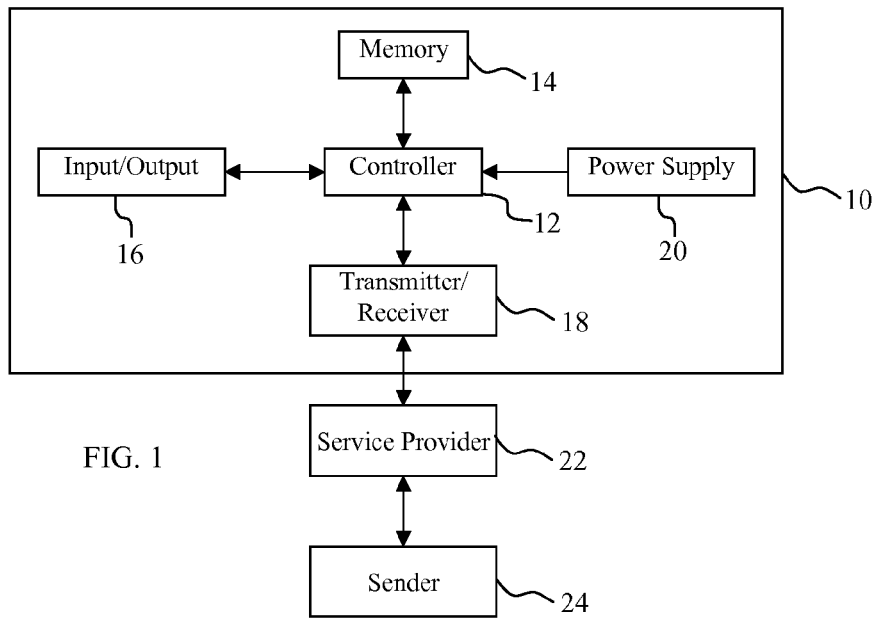
FIG. 1 illustrates a block diagram of a system according to one embodiment of the present disclosure through which a communication management feature may be implemented.

While the present invention is susceptible of embodiment in various forms, there is shown in the drawings and will hereinafter be described one or more embodiments with the understanding that the present disclosure is to be considered illustrative only of the invention and is not intended to limit the invention to any specific embodiment disclosed herein.

FIG. 1 illustrates typical components of a device 10, such as a desktop computer, TV/Set-Top box, static or portable game console, smart phone, tablet computer, PDA, portable media device, and the like, that is capable of sending and/or receiving communications. In FIG. 1, the device 10 includes a controller 12 that is coupled to a memory 14, any number of input and output ("I/O") devices or components 16, and a transmitter and/or receiver 18. In addition, the device 10 includes a power supply 20, such as a rechargeable battery or a connection to an electrical outlet, to supply power to the various components of the device.

In one non-limiting example, the device 10 is a smart phone capable of sending and receiving communications, such as phone calls, text messages, including messages sent using the short message service ("SMS") and the multimedia messaging service ("MSM"), electronic mail, instant messaging requests, and electronic updates from social networking sites, news services, weather stations, financial services, travel agencies, etc. In the present example, the controller 12 controls the receipt and processing of such communications, among other operations and functions. The memory 14 generally includes both volatile memory, such as RAM, and non-volatile memory, such as ROM and flash memory. The memory 14 stores data, such as an operating system, a communication management system, which may be implemented as a software program or application, other software applications that enable receipt and transmission of communications and other features such as calendars, email, browsers, word processing programs, games, and the like, communications sent to the device, etc. The memory 14 also stores caller or sender identification information, such as names associated with phone numbers, email addresses, company or work information, addresses, and the like. Such sender identification information may be used to identify allowed contacts and communications, as will be described in more detail hereinafter.

Further, the I/O devices 16 may include, without limitation, a display, speaker, microphone, keypad, touch panel, indicator lights, vibration motor, and the like, as would be apparent to one of ordinary skill. The transmitter/receiver 18 includes known components for transmitting and receiving communications over any known wired or wireless connection, standard, or protocol, such as the Internet, an intranet, voice over internet protocol ("VOIP"), satellite, 3G, SMS, MMS, 4G, WIMAX, etc. In other embodiments, the device 10 may include additional or fewer components, the operation of which would be apparent to one of ordinary skill in the art.

FIG. 1 further illustrates a general interaction between the device 10, a service provider 22, and a sender 24. Generally, communications along with other commands and data, for example, sender identification information, can be sent to the device 10 from the service provider 22 or from the sender 24 through the service provider. As will be described in more detail hereinafter, the device 10 and/or the service provider 22 may be configured to implement a feature that manages communications sent to the device and controls how the device notifies a recipient of incoming communications.

Figure 2:
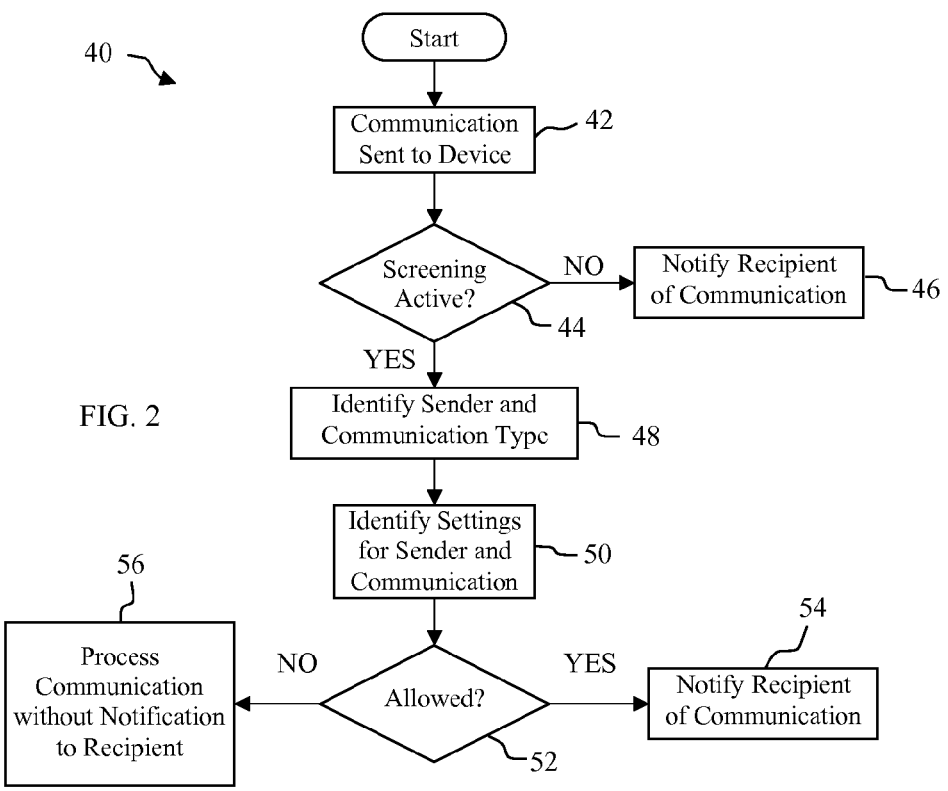
FIG. 2 is a flowchart according to one embodiment detailing a communication management process that may be implemented through the device of FIG. 1.

FIG. 2 illustrates a communication management process 40 that provides a feature to restrict, filter, and/or screen incoming communications based on customizable user preferences. The process 40 may be implemented by hardware and/or software components of the device 10 of FIG. 1. In one example, one or more portions of the process 40 may be implemented as a software program or application that can be downloaded by a user onto the device 10. For example, the software application may be available for user download on an online software store, such as Android Market, Apple's App Store, Nokia's Ovi Store, Blackberry's App World, Windows Marketplace, etc. Alternatively, the software program can be incorporated into the device 10 by a manufacturer.

The process 40 begins at a block 42 when a communication is sent to the device 10. As discussed above, the communication may be a phone call, text message, electronic mail, or any other type of electronic information. Following the block 42, control passes to a block 44, which determines if the communication management screening feature is active. If not active, control passes to a block 46 and the device 10 notifies the recipient of the communication according to a default setting or mode. For example, the device may be set to an audible default mode, which notifies the recipient with an audible ring and/or vibration and displays any available identification information of the sender. In another example, the device may be set to a silent default mode, which notifies the recipient with only vibration and/or a display of identification information. After the recipient is notified of the communication, the recipient may answer, ignore, forward, or otherwise respond to the communication.

However, if the screening feature is active, control passes to a block 48, which bypasses the default notification of the block 46, and identifies the identification information of the sender and a communication type, such as phone call, text message, email, etc. The block 48 may process the communication and extract the sender identification information therefrom in a known manner and can also provide senders with an option to identify themselves, for example, by speaking their name or by typing their name into a keypad. The option for senders to identify themselves may be useful where an otherwise known sender is sending the communication from an unknown phone number, for example.

After the block 48, control passes to a block 50 and the user preferences or settings for the sender and communication type are identified. At a block 52, a decision is made in accordance with the identified user settings whether the communication is allowed or not allowed. If allowed, the device 10 notifies the recipient of the communication at a block 54 according to the identified settings. The actual notification performed at the block 54 may be similar or even identical to the notification performed by the block 46 but may also process and route the communication differently based on the identified settings. For example, the block 46 may notify the user of the communication with an audible ring, a vibration, and a display but the block 54 may notify the user with only a vibration and a display in accordance with the identified and user customizable settings.

If the communication is not allowed, control passes to a block 56 and the recipient is not notified of the communication, which is otherwise processed according to the identified settings. For example, if the communication is a phone call, the call may be forwarded directly to a voicemail box without providing any audible, tactile, or visual indication to the recipient. If the communication is a text message or email, the communication may be stored in an associated inbox for the user to check manually at a later time, once again without providing any audible, tactile, or visual indication to the recipient. Alternatively, the recipient may set a user preference to route a non-allowed call, text, or email to a storage location but still provide a visual indication of the communication to the recipient.

Generally, if the screening feature is not active, the default notification of the block 46 applies to all incoming communications regardless of the communication type or user. However, if the screening feature is active, the decision to notify or not notify a user and the type of notification to issue can be customized for specific types of communications and/or specific users.

Various modifications can be made to the process 40 of FIG. 2 without departing from the spirit of the present disclosure. For example, the blocks may be performed in different sequences and the process may include additional or fewer blocks, as would be apparent to one of ordinary skill in the art.

In another example, one or more of the blocks of the process 40 may be implemented by interactions between the device 10 and the service provider 22. For example, at the block 42, the service provider 22 may receive a communication intended to be sent to the device 10. At the block 44, the service provider 22 processes instructions from the device 10 or from a user of the device 10 to determine if the screening feature is active. Illustratively, the user or recipient may activate the screening feature on the device 10, which sends an instruction to the service provider 22 that the feature is active. Alternatively or in combination, the user or recipient may send an instruction directly to the service provider by logging into a website and activating the screening feature.

In the present example, if the feature is not active, control passes to the block 46 and the service provider 22 provides the communication to the device 10, which notifies the recipient. If the feature is active, control passes to the block 48 and the service provider 22 may identify the sender and communication type. At the block 50, the service provider 22 may identify user preferences or settings based on the sender and communication type. Thereafter at the block 52, the service provider 22 can make the decision to provide the communication to the device 10, block 54, or not, block 56.

Figure 3:
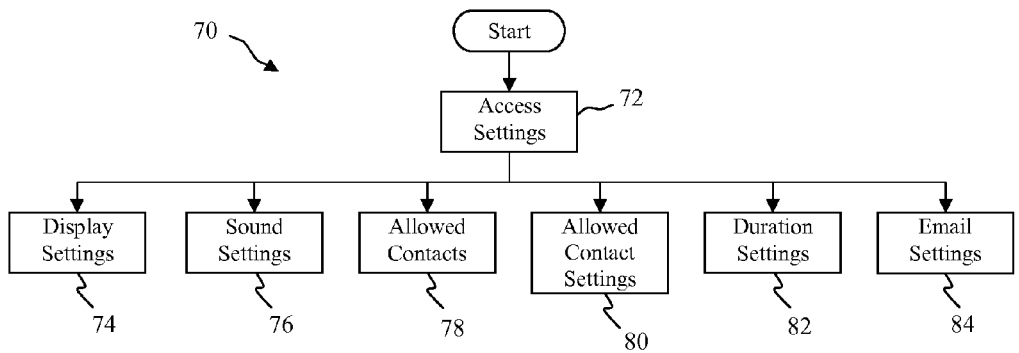
FIG. 3 is a flowchart according to another embodiment detailing a process for modifying various settings utilized by a communication management system or process.
Figure 4A:
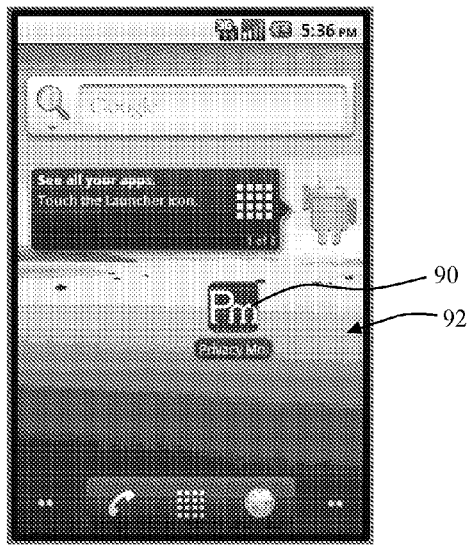
FIGS. 4A-4J illustrate non-limiting examples of screen shots that may be displayed to a user, for example, on the device of FIG. 1, to modify the settings utilized by a communication management system or process.
Figure 4B:
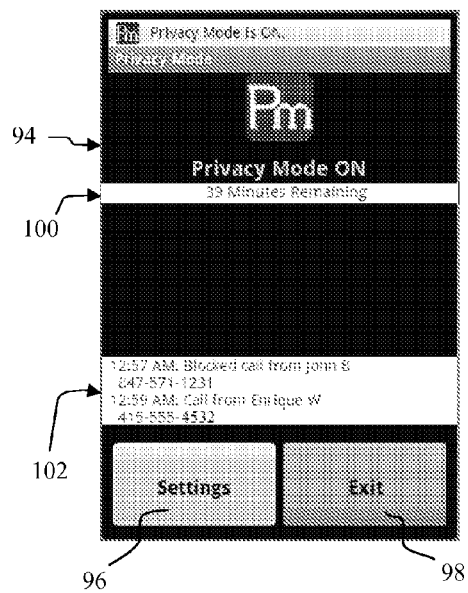

FIG. 3 illustrates a process 70 according to one example for modifying various settings and user preferences of the communication management system or application. FIGS. 4A-4J are screenshots showing examples of how a user can navigate through the communication management application. The process 70 initiates at a block 72, which allows a user to access the settings of the communication management system. FIG. 4A illustrates an example where the system is a software application represented by an icon 90 displayed on a "desktop" screen 92. In another example, the system is a website operated by the service provider 22 and represented by the icon 90. A user may click on the icon 90 to access a home screen 94 of the application, as shown in FIG. 4B. The home screen 94 of FIG. 4B includes a settings button 96, which a user can select to access the settings of the communication management system. Further, the home screen 94 may include an exit button 98 to exit the home page and return to the desktop screen 92, for example. In addition, the home screen 94 may list a remaining duration 100 that the screening feature will be active before it is automatically deactivated. The home screen 94 may also include log history 102 of blocked and/or allowed communications.

Figure 4C:
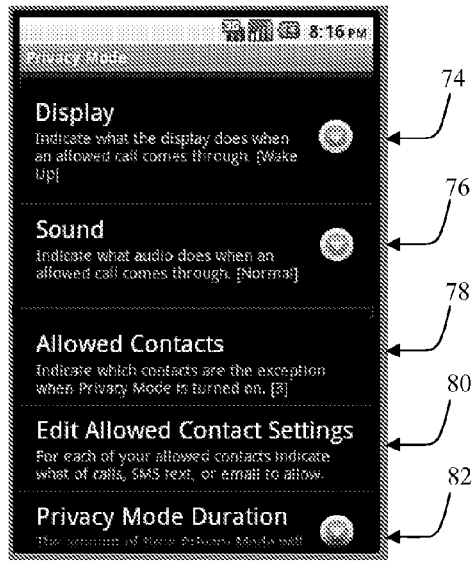
Figure 4D:
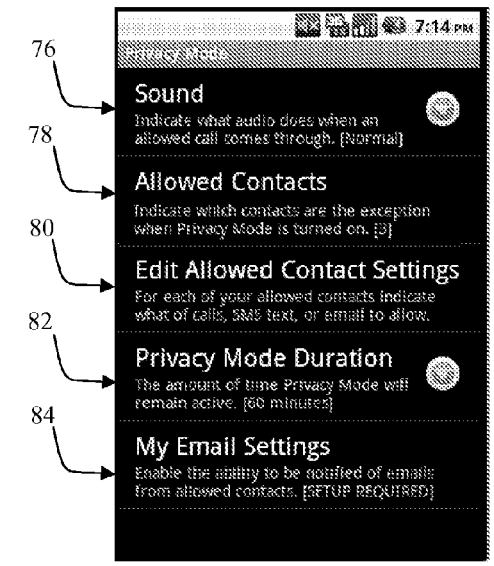
Figure 4E:
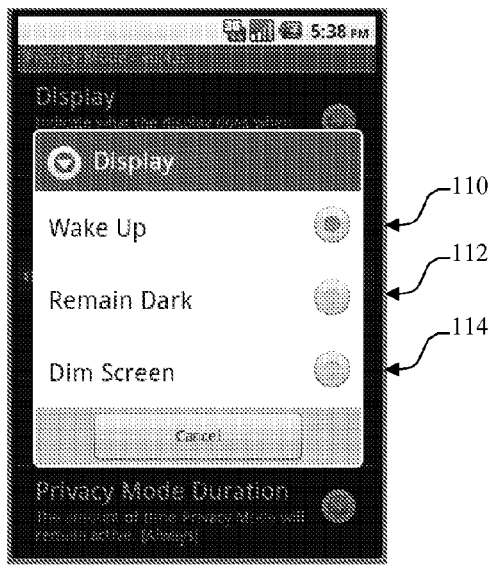
Figure 4F:
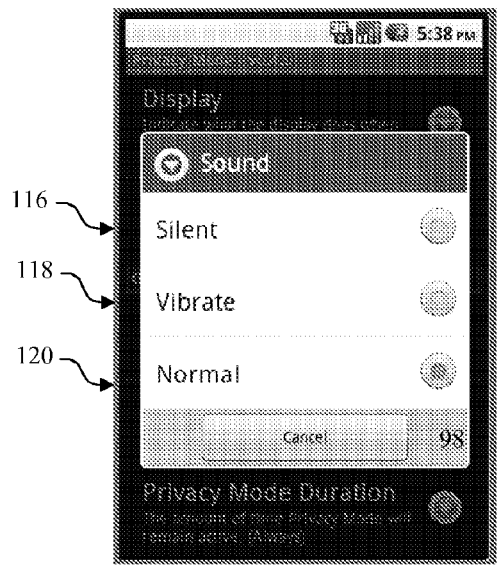

After the user accesses the settings of the communication management system, control may pass to any one of blocks 74-84 of FIG. 3 for the user to modify different settings. FIGS. 4C and 4D illustrate examples of how the blocks 74-84 may be displayed to a user. More particularly, at the block 74, the user can modify display settings that control what a display does when an allowed communication is received. For example, referring to FIG. 4E, the user may select between a variety of options, including wake up 110, remain dark 112, dim screen 114, etc.

At the block 76, the user can modify sound settings that control what audio does when an allowed communication is received. For example, referring to FIG. 4F, the user may select between a variety of options, including remain silent 116, vibrate 118, normal 120, etc.

Figure 4G:
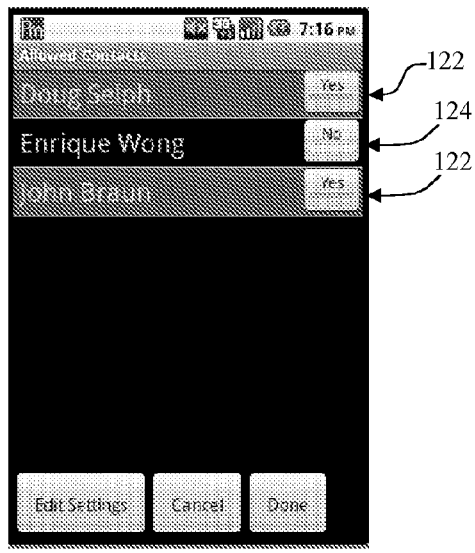
Figure 4H:
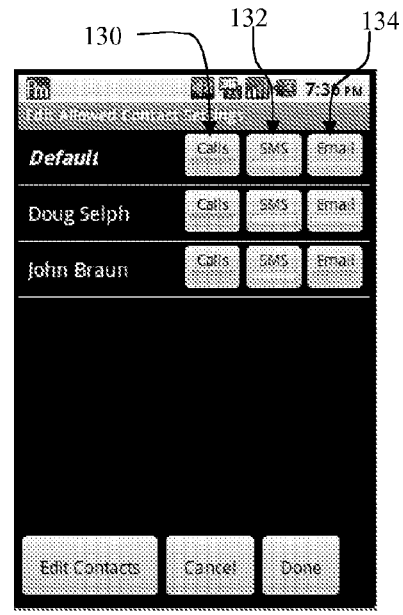
Figure 4I:
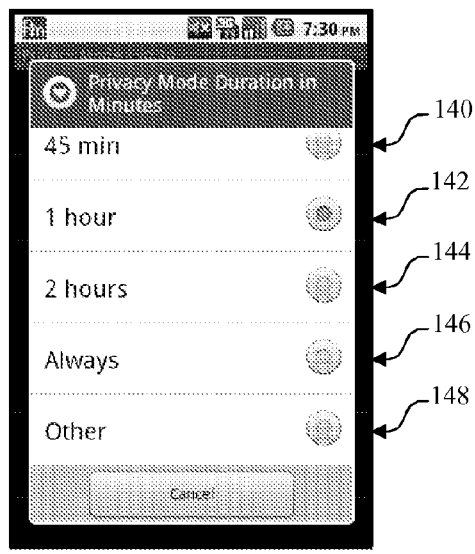
Figure 4J:
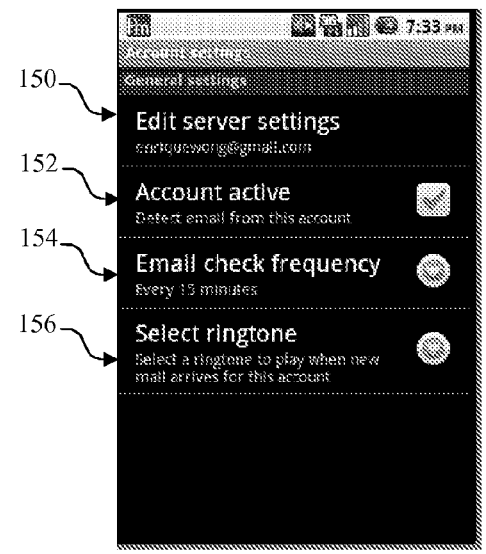

Further, at the block 78, the user can modify allowed contacts to control which contacts are allowed when the screening feature is active. For example, the user may designate allowed 122 and not-allowed 124 contacts on an individual contact-by-contact basis, as seen in FIG. 4G. In another example, at the block 78, the user may select allowed contacts on a group-by-group basis, wherein a user may create customizable groups with any number of contacts, such as a family group, a friends group, a work group, a client group, an emergency group, etc.

At the block 80, the user can modify settings for the allowed contacts. For example, referring to FIG. 4H, the customizable settings may include a choice of allowed communications, such as only calls 130, only text messages 132, only emails 134, only chat requests, or any other combination of the above and other communications. In one embodiment, at the block 80, the selection of a specific type of allowed communication may also provide an option to notify a sender of such allowed communication type. For example, an allowed or even a non-allowed sender may send a communication to the recipient's device and receive an audible or visual message that the recipient is not responding to phone calls at the moment but is able to view text messages and emails.

At the block 82, the user can modify the time period that the screening feature will remain in effect until it is automatically disabled. Alternatively, the user may manually turn off or exit the screening feature, as would be understood by one of ordinary skill. For example, referring to FIG. 4I, the user can select from a number of preset options, such as thirty minutes, forty-five minutes 140, one hour 142, two hours 144, always on 146, etc. or the user can manually enter any length of time 148. The option 148 may also provide an easy quit option that can be enabled so that a single or multiple button activation will automatically deactivate the screening feature without having to access the communication management system directly. For example, the easy quit option can be enabled so that pressing a volume up button on the device 10 will deactivate the screening feature.

In one embodiment, at the block 82, the communication management system may be synchronized with electronic calendars available through the device. For example, if the user sets the screening feature to be active for the next 2 hours, then the device's electronic calendar may automatically block off the next two hours and indicate that the user is unavailable or not receiving communications. Another option allows the user to modify the electronic calendar directly, for example, to schedule a meeting for the next two hours, which then synchronizes with the communication management system and turns on the screening feature for the same time period. In yet another embodiment of the block 82, the user can select preset and customizable time period categories. For example, the user can set a bedtime category between 11:00 pm and 7:00 am during which only calls from the emergency group are allowed. Other categories, for example, may include a weekly status meeting category, a working out category, a meal time category, a family time category, etc.

At the block 84, the user can modify email settings to enable screening of emails from allowed contacts. For example, referring to FIG. 4J, the user may edit server settings 150 to enter information for one or more of the recipient's email accounts, such as usernames, passwords, wireless connection data, e.g., port number, server address, security protocol, etc. The user may also activate/deactivate email accounts 152, set a frequency for checking emails 154, set a ringtone to play when a new allowed email arrives 156, etc.

Other embodiments include all of the various combinations of individual features of each of the embodiments or examples described herein.

In the present disclosure, the words "a" or "an" are to be taken to include both the singular and the plural. Conversely, any reference to plural items shall, where appropriate, include the singular.

INDUSTRIAL APPLICABILITY

The present disclosure provides a communication management feature that allows a user to screen or filter any type of communication in order to eliminate unnecessary disruptions and improve productivity.

Numerous modifications to the present disclosure will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

We claim:

1. A method for screening incoming communications, comprising the steps of:
    receiving an incoming communication intended for a communication device of a recipient;
    identifying a sender of the communication and a communication type, which includes an email;
    identifying screening settings based on the sender and the communication type;
    determining whether the communication is allowed in accordance with the identified settings;
    notifying a recipient of the communication, if the communication is allowed; and
    processing the communication without notifying a recipient, if the communication is not allowed,
    wherein the screening settings include display settings that control what a display does when an allowed communication is received, sound settings that control audio settings when an allowed communication is received, allowed contacts that control which contacts are allowed, settings that control communication types that are allowed, and duration settings that control a time period that the communication screening will remain in effect until the communication screening is automatically disabled.

2. The method of claim 1, further comprising the step of activating an application, wherein the application performs the steps of identifying a sender and a communication type, identifying screening settings, and determining whether the communication is allowed, further wherein the activation of the application bypasses a default mode of notifying a recipient of the incoming communication, and wherein the application further performs the step of displaying a communication log of allowed and not allowed communications.

3. The method of claim 2, wherein the application is downloaded from an online software store and stored on the communication device.

4. The method of claim 2, wherein a service provider performs the steps of receiving an incoming communication, identifying a sender and a communication type, identifying screening settings, and determining whether the communication is allowed.

5. The method of claim 1, wherein the communication type includes a phone call and a text message.

6. The method of claim 1, wherein the allowed contacts can be selected on an individual contact basis and a group basis.

7. The method of claim 1, wherein the screening settings includes an option to notify a sender of one or more allowed communication types using an audible or visual message.

8. The method of claim 1, wherein the duration setting time period can be synchronized with an electronic calendar such that an appointment can be set in the electronic calendar for a certain time period and the communication screening automatically activated for that certain time period.

9. The method of claim 1, wherein the duration setting time period can be set by one or more categories, and wherein the screening settings further include an easy quit option that can be enabled to allow the communication screening to be deactivated by a button activation before expiration of the duration setting time period.

10. The method of claim 1, wherein the screening settings include email settings to enable screening of emails from allowed contacts, and wherein the email settings include information for the recipient's email account, including a username and a password.

11. A software system stored in a non-transitory, tangible computer-readable medium for screening incoming communications, comprising
    a first routine that receives an incoming communication;
    a second routine that identities a sender of the communication and a communication type, which includes an email;
    a third routine that identifies screening settings based on the sender and communication type;
    a fourth routine that determines whether the communication is allowed in accordance with the identified settings;
    a fifth routine that notifies a recipient of the communication, if the communication is allowed; and
    a sixth routine that processes the communication without notifying a recipient, if the communication is not allowed,
    wherein the screening settings include display settings that control what a display does when an allowed communication is received, sound settings that control audio settings when an allowed communication is received, and duration settings that control time period that the communication screening will remain in effect until the communication screening is automatically disabled.

12. The software system of claim 11, wherein the communication type includes a phone call and a text message.

13. The software system of claim 11, wherein the screening settings include allowed contacts that control which contacts are allowed, settings for allowed contacts that control communication types that are allowed, and email settings to enable screening of emails from allowed contacts.

14. The software system of claim 13, wherein the allowed contacts can be selected on an individual contact basis and a group basis and the screening settings include an option to notify a sender of allowed communication types using an audible or visual message.

15. A system for screening incoming communications, comprising;
   means for receiving an incoming communication;
   means for identifying a sender of the communication and a communication type, which includes an email;
   means for identifying screening settings based on the sender and communication type;
   means for determining whether the communication is allowed in accordance with the identified settings;
   means for notifying a recipient of the communication, if the communication is allowed; and
   means for processing the communication without notifying a recipient, if the communication is not allowed,
   wherein the screening settings include display settings that control what a display does when an allowed communication is received, sound settings that control audio settings when an allowed communication is received, and duration settings that control a time period that the communication screening will remain in effect until the communication screening is automatically disabled.

16. The system of claim 15, wherein the communication type includes a phone call and a text message, and wherein the screening settings include allowed contacts that control which contacts are allowed, settings for allowed contacts that control communication types that are allowed, and email settings to enable screening of emails from allowed contacts.

17. The system of claim 16, wherein the allowed contacts can be selected on an individual contact basis and a group basis and the screening settings include an option to notify a sender of allowed communication types using an audible or visual message.

* * * * *

UNITED STATES PATENT AND TRADEMARK OFFICE
CERTIFICATE OF CORRECTION

PATENT NO. : 8,385,528 B2
APPLICATION NO. : 12/947666
DATED : February 26, 2013
INVENTOR(S) : Douglas Scott Selph et al.

It is certified that error appears in the above-identified patent and that said Letters Patent is hereby corrected as shown below:

In the Claims:

In column 8, line 53, the phrase "duration setting that contol time period that the com-" should read "duration settings that control a time period that the com-".

Signed and Sealed this
Second Day of July, 2013

Teresa Stanek Rea
*Acting Director of the United States Patent and Trademark Office*